United States Patent [19]
Aron

[11] Patent Number: 5,685,136
[45] Date of Patent: Nov. 11, 1997

[54] HAYMAKING MACHINE

[75] Inventor: Jerome Aron, Dossenheim-Sur-Zinsel, France

[73] Assignee: Kuhn S.A., Saverne Cedex, France

[21] Appl. No.: 420,514

[22] Filed: Apr. 12, 1995

[30] Foreign Application Priority Data

Apr. 12, 1994 [FR] France ................... 94 04571

[51] Int. Cl.⁶ ................................................ A01D 78/12
[52] U.S. Cl. ................................................ 56/367; 56/377
[58] Field of Search ........................... 56/367, 365, 370, 56/372, 377, 379, 380, 384, 396

[56] References Cited

U.S. PATENT DOCUMENTS

| | | |
|---|---|---|
| 3,650,101 | 3/1972 | Aron . |
| 4,144,699 | 3/1979 | Aron . |
| 4,149,364 | 4/1979 | Aron . |
| 4,445,312 | 5/1984 | Cartner . |
| 4,628,673 | 12/1986 | Aron . |
| 4,656,821 | 4/1987 | Aron . |
| 4,693,065 | 9/1987 | Aron et al. . |
| 4,694,641 | 9/1987 | Porter . |
| 4,723,404 | 2/1988 | Aron . |
| 4,875,332 | 10/1989 | Aron . |
| 4,914,901 | 4/1990 | Aron . |
| 4,922,700 | 5/1990 | Aron . |
| 4,953,346 | 9/1990 | Aron . |
| 5,024,053 | 6/1991 | Aron . |
| 5,060,465 | 10/1991 | Jerome . |
| 5,404,702 | 4/1995 | Lewis ........................... 56/365 |

FOREIGN PATENT DOCUMENTS

| | | |
|---|---|---|
| 0296666 | 12/1988 | European Pat. Off. . |
| 0300937 | 1/1989 | European Pat. Off. . |
| 0439068 | 7/1991 | European Pat. Off. . |
| 0558430 | 9/1993 | European Pat. Off. . |
| 3926381 | 12/1990 | Germany . |
| 9115158 | 2/1992 | Germany . |

*Primary Examiner*—Terry Lee Melius
*Attorney, Agent, or Firm*—Oblon, Spivak, McClelland, Maier & Neustadt, P.C.

[57] ABSTRACT

A haymaking machine includes at least one swathing rotor supported by a frame which can be attached to a tractor. The rotor is driven during operation by a hydraulic motor which is supplied by hydraulic lines that are connected to the hydraulic motor. The frame carries a guard which at least partially surrounds the rotor and includes at least one folding part which can be folded back to reduce the dimensions of the guard. The haymaking machine further includes a stopping device which is placed on one of the hydraulic lines and an actuating device for actuating the stopping device. The actuating device is connected to the at least one folding part of the guard.

18 Claims, 3 Drawing Sheets

HAYMAKING MACHINE

BACKGROUND OF THE INVENTION

1. Field of the Invention

The present invention relates to a haymaking machine, especially a swather, which includes at least one swathing rotor supported by a frame which can be attached to a tractor. The rotor is driven in rotation during operation by a hydraulic motor which is supplied by means of hydraulic lines. The aforementioned frame bearing in addition a guard which surrounds at least partially the aforementioned rotor and which has at least one part which can be folded up in order to reduce its overall dimensions.

2. Discussion of the Related Art

On a machine of this kind it is necessary to stop the rotation of the rotor before changing the position of the folding part of the guard, in order to be able to work on the rotor or for the transport. In general the imparting of rotation and stopping of the rotor are controlled from the tractor. However, it might happen that the folding part is moved unwillingly before complete stopping of the rotor. It is also possible that it is not correctly positioned during work. In these cases the rotor can strike a person and wound him seriously or can even bump up against an obstacle and be itself considerably damaged. In addition, the rotor can be made to rotate inadvertently from the tractor while the folding part of the guard is raised and a person is located in the trajectory of the rotor in order to do maintenance work on it, for example.

SUMMARY OF THE INVENTION

An object of the present invention is to provide for a haymaking machine such as described in the introduction and which does not have the aforementioned risks.

For this purpose an important feature of the invention relates to a machine that includes at least one stopping device which is placed on one of the hydraulic lines going to the hydraulic motor and a means of actuating the stopping device which is connected to the one or more folding parts of the guard.

The stopping device can comprise a slide valve distributor which allows one to close and open the oil passage. It is therefore possible to block circulation of the oil which actuates the hydraulic motor and consequently to stop the driving action of the rotor independently of the control devices of the circulation which are usually located on the tractor. In addition, given that the means which actuates the slide valve distributor is connected to the one or more folding parts of the guard, it is the position of this or these parts which determines opening and closing of the hydraulic line. This means of actuation is designed so that the slide valve distributor cuts off the oil circuit when a folding part of the guard is displaced towards the transport position. Driving of the rotor is then interrupted as long as the folding part is not brought back to the position where it ensures the function of protection. The risk of the rotor beginning to rotate without protection being ensured is consequently obviated.

According to a further feature of the invention the guard includes two folding parts and the stopping device comprises two slide valve distributors in which each one is connected to one of the folding parts. In this method of implementation each of the folding parts of the guard controls its own slide valve distributor.

Another object of the invention is to provide for a stopping device which comprises a slide valve distributor whose means of actuation comprises an abutment which is firmly attached to the rod of a hydraulic jack which is used to displace one or more folding parts of the guard. This abutment is advantageously designed so that it will actuate the slide valve distributor before displacing the folding part or parts toward the transport position. This prevents manual intervention of an operator and guarantees stopping of rotor driving before folding back of one part of the guard.

Another object of the invention is to provide for a machine which has at least one rotor which is connected to a support arm which can be moved upward, said machine including two devices for stopping driving action of the rotor. Means of actuation are connected to these stopping devices in which one is connected to a folding part of the guard and the other to the support arm. According to this arrangement the stopping of the driving action of the rotor is ensured at once when one part of the guard is folded back and when the rotor is raised by means of its carrying arm.

The present invention accordingly provides for a haymaking machine which comprises at least one swathing rotor carried by a frame which can be attached to a tractor, the rotor being driven to rotate during operation by a hydraulic motor which is supplied by hydraulic lines which are connected to the hydraulic motor, the frame carrying a guard which at least partially surrounds the rotor and includes at least one folding part which can be folded back to reduce the dimensions of the guard; at least one stopping device which is placed on one of the hydraulic lines which lead to the hydraulic motor; and actuating means for actuating the stopping device, the actuating means being connected to the at least one folding part of the guard.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
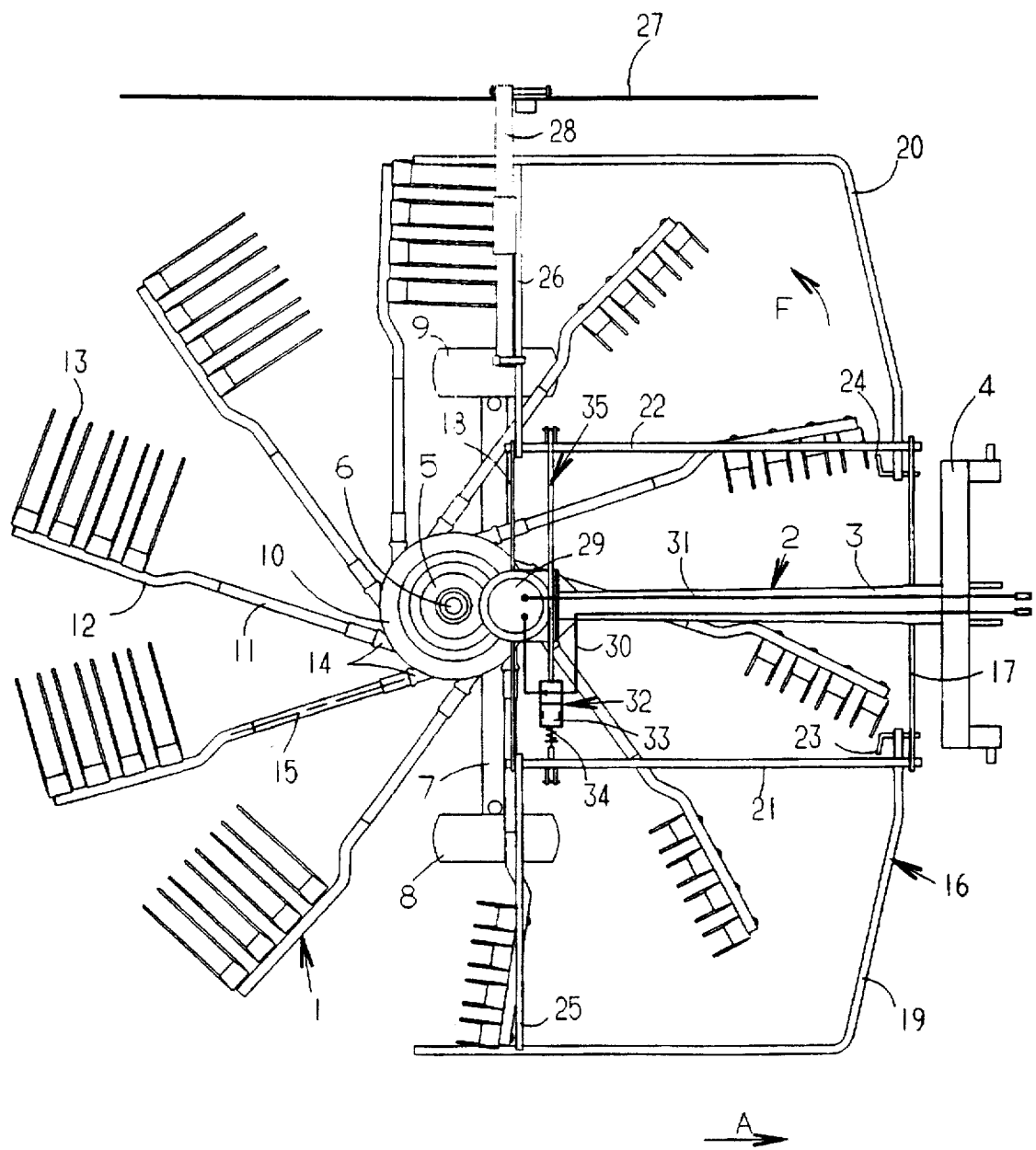
FIG. 1 represents a view from above, of a machine in accordance with the invention in a working position.

Referring now to the drawings wherein like reference numerals represent identical or corresponding parts throughout the several views, and more particularly to FIG. 1 thereof, the haymaking machine shown in FIG. 1 is a swather which includes a swathing rotor (1) carried by a frame (2). The frame (2) comprises a beam (3) which is directed in a direction of forward movement (A) and which is provided at its most forward end with a three point attachment support (4). The support (4) allows coupling of the swather to a drive tractor which is not shown. The other end of the beam (3) has a semi-housing (5) which is open towards the bottom. This semi-housing (5) has, approximately in its middle, an opening in which a shaft (6) is secured which is directed approximately vertically downward. The lower end of this shaft (6) supports a transversal support (7) with two rollers (8, 9) which can rest on the ground.

The rotor (1) is installed on shaft (6) so as to be able to turn about this shaft. The rotor (1) comprises a rotating box (10) equipped with several arms (11) which extend to the outside and which include external parts (12) which can be removed. These arms (11) are provided at their most distant ends of the box (10) with raking forks (13). They are installed in bearings (14) which are fastened to the box (10), so as to be able to pivot about their longitudinal geometric axes (15). In the internal space of the box (10) a control cam is located which is secured to shaft (6). Each fork-bearing arm (11) has a roller which works together with the control cam at its end located on the inside of the box (10).

The method of implementation of the rotor (1) can be different from that described previously. For example it can include uncontrolled fork-carrying arms.

The frame (2) carries in addition a guard (16) which surrounds at least partially the rotor (1). This guard (16) prevents persons or animals from entering the trajectory of the fork-carrying arms (11). It also prevents the arms (11) from encountering obstacles which could damage them. The guard (16) comprises two central bars (17 and 18) of which one is secured to the beam (3) and the other to the semi-housing (5) and two lateral folding parts (19 and 20). The lateral folding parts (19 and 20) are articulated on the central bars (17 and 18) by means of shafts (21 and 22) which are directed in the direction of forward movement (A). These two shafts (21 and 22) allow one to fold back the lateral folding parts (19 and 20) from a horizontal position for working to a vertical position for transport. The lateral folding parts (19 and 20) can be blocked in each of these positions with pins (23 and 24). Each of these folding parts (19 and 20) comprises a tube which is bent approximately in the shape of an "L". A first branch of each L-shaped tube is firmly attached to the corresponding articulation shaft (21 or 22) and extends approximately along the extension of the forward bar (17). The second branch of each L-shaped tube is guided toward the rear and is connected to the corresponding articulation shaft (21 or 22) by a cross piece (25 or 26). As is shown in FIG. 1, the guard (16) extends on the forward side—seen in the direction of forward movement (A)—and on the lateral sides of rotor (1). Since during operation the swather is displaced in the direction of forward movement (A) there is practically no risk that a person or animal will touch the rotor (1) on the rear side. It is nevertheless possible to extend the lateral parts (19 and 20) toward the rear side of the rotor (1) in order that they can also ensure protection on this side.

A deflector (27) is connected to the folding lateral part (20) of the guard (16) by means of a rod (28). This deflector (27) is arranged laterally to the rotor (1) in a manner to limit lateral throwing of the displaced hay. It comprises a grating or a rectangular shaped canvas. Its height almost equals that of the rotor (1) itself.

The box (10) of the rotor (1) includes a notched crown on its upper side. The latter meshes with a pinion which is attached to a shaft of a hydraulic driving motor (29). This motor (29) is secured on the semi-housing (5). It is connected to a hydraulic pump which causes oil to circulate ensuring its actuation by means of two hydraulic lines (30 and 31) of which one (30) is used for admission of oil from the motor (29) and the other (31) for return. The pump can be that of the hydraulic equipment of the tractor. In this case the two lines (30 and 31) are branched along the hydraulic intakes of the latter. The swather can also be equipped with a hydraulic piece of equipment which has its own pump. The lines (30 and 31) are then branched to this pump.

A stopping device (32) is placed on the hydraulic line (30). However it can also be located on the other line (31). In the examples given here the stopping device (32) comprises a slide valve distributor (33) with two positions. In one of these positions the passage in the hydraulic line (30 or 31) is open while in the other position the passage is closed. It is provided with a spring (34) which pushes the slide valve of the distributor (33) to the position in which the passage is open. This stopping device (32) could also comprise a shutter or other equivalent means.

A means of actuation (35) of the stopping device (32) connects the latter to the folding parts (19 and 20) of the guard (16). As one can see from FIG. 2 the means of actuation (35) comprises a bent rod (36) provided with a shaft (37) which is connected to the slide valve of the distributor (33). The rod (36) includes at each of its ends an oblong opening (38, 39). Each folding part (19, 20) of the guard (16) (in this case their shafts (21 and 22)) have a lever (40, 41) with a bent end which is located in one of the oblong openings (38 and 39). The length of each of these oblong openings (38 and 39) is approximately equal to the value of displacement of the bent end of the lever (40, 41) when the corresponding folding part (19, 20) is displaced about its own shaft (21, 22). In addition, these oblong openings (38 and 39) and the levers (40 and 41) are designed so that the bent ends of these levers (40 and 41) are abutted against the same side in openings (38 and 39) (right side of each of these openings in FIG. 2) when the folding parts (19 and 20) are approximately horizontal and that the displacement upward of any one of these folding parts (19 and 20) causes displacement of the rod (36) and closing of the distributor (33), without this displacement involving the other folding part (19 or 20). On the other hand, at the time of displacement downward of the lateral parts (19 and 20), only the one which is displaced last releases the rod (36) so that the distributor (33) can open.

Figure 3:
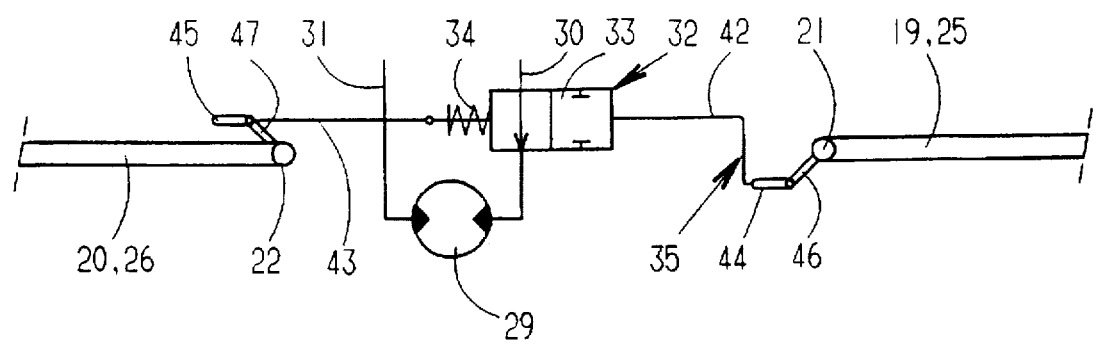
FIGS. 3 to 5 show schematically other examples of implementation of the stopping devices and their means of actuation.

In the example of implementation shown in FIG. 3 the stopping device (32) is also made of a slide valve distributor (33) which is placed on the supply line (30) of the hydraulic motor (29). The means of actuation (35) comprises two rods (42 and 43). Each one is connected by one of its ends to the slide valve of the distributor (33). The second end of each rod (42, 43) is connected to one of the folding parts (19, 20) of the guard (16). For this reason this second end of each rod (42, 43) has an oblong opening (44, 45) in which the bent end of a lever (46, 47) is engaged which is firmly attached to the corresponding folding part (19, 20) of the guard (16). As in the preceding example the length of each of these oblong openings (44, 45) is approximately equal to the value of displacement of the bent end of the corresponding lever (46, 47) about the shaft (21 or 22). These oblong openings (44, 45) and the levers (46, 47) are designed so that their bent ends are resting on the same side of the oblong openings (44, 45) when the folding parts (19 and 20) are approximately horizontal, and that the displacement upward of any one of the folding parts (19, 20) causes displacement of the two rods (42 and 43) and the closing of the distributor (33). This displacement is not reflected on the second folding part (19 or 20). In addition, at the time of return to horizontal position of the lateral part (19, 20), only the one which is displaced last can release the slide valve of the distributor (33) so that it can open.

Figure 4:
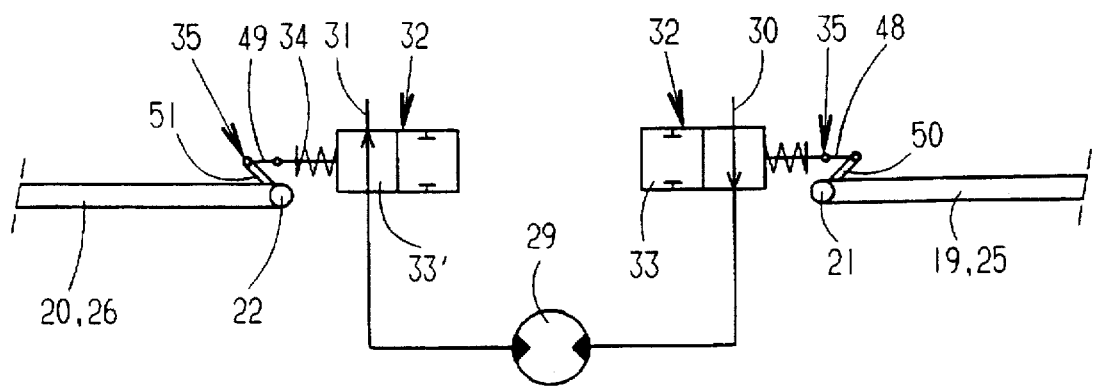

In the example of implementation in accordance with FIG. 4, the stopping device (32) comprises two slide valve distributors (33 and 33'), one (33) of these distributors is located on the supply line (30) of the hydraulic motor (29) and the other (33') is located on the return line (31). Each of these slide valve distributors (33, 33') is connected to one of the folding parts (19, 20) of the guard (16) through the intermediary of an actuation means (35). Each means of actuation (35) comprises a rod (48, 49) of which one of the ends is connected to the corresponding distributor (33, 33') and the other to a lever (50, 51) which is firmly attached to one of the lateral parts (19, 20) of the guard (16).

Figure 5:
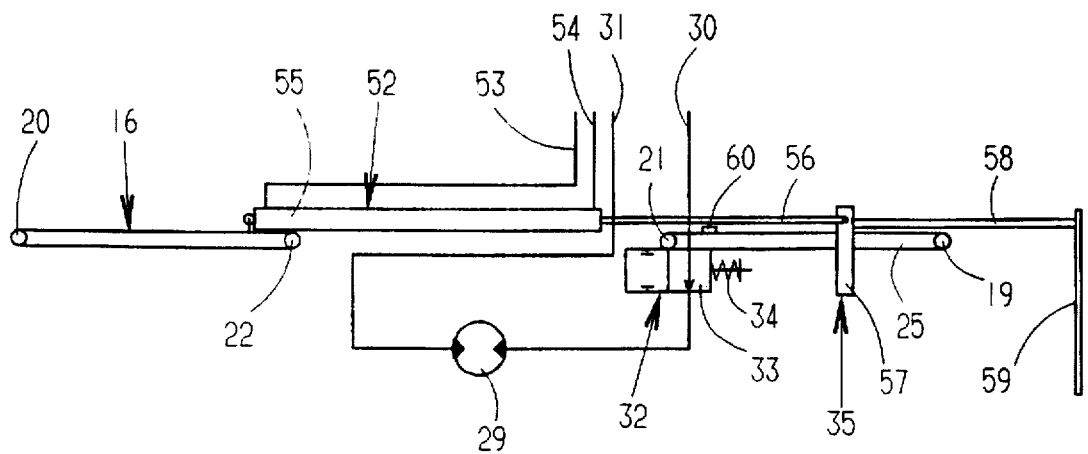

In the example of implementation in accordance with FIG. 5 the two folding parts (19 and 20) of the guard (16) can be moved by means of a hydraulic jack (52). This jack is connected by pipes (53 and 54) to the hydraulic equipment of the tractor, which allows to actuate it. The body (55) of this hydraulic jack (52) is articulated on the folding part (20) of the guard (16). Its rod (56) carries an abutment (57) which is controlled in such a manner as to be able to be displaced longitudinally on the cross piece (25) of the second folding part (19) of the guard (16). On the other hand, the abutment (57) carries an arm (58) which extends beyond the guard (16) and to which a lateral deflector (59) similar to deflector (27) of FIG. 1 is attached. This deflector (59) can thus be moved further away or closer to rotor (1) by means of hydraulic jack (52). The stop device (32) comprises a slide valve distributor (33) which is placed on the supply line (30) of the hydraulic motor (29). This distributor (33) is preferably fastened to the cross piece (25) of the folding part (19). The actuation means (35) of this distributor (33) comprises the abutment (57) which is one piece with rod (56). For this purpose the abutment (57) extends toward the bottom so that it meets the slide valve distributor (33) when it is displaced with rod (56) of the hydraulic jack (52). On the cross piece (25) an arresting device (60) is provided which limits displacement of the abutment (57) and which causes raising of the folding part (19) about its shaft (21). The side of this arresting device (60) against which the abutment (57) then rests is located between the body of the distributor (33) and the forward end of its slide valve.

Figure 6:
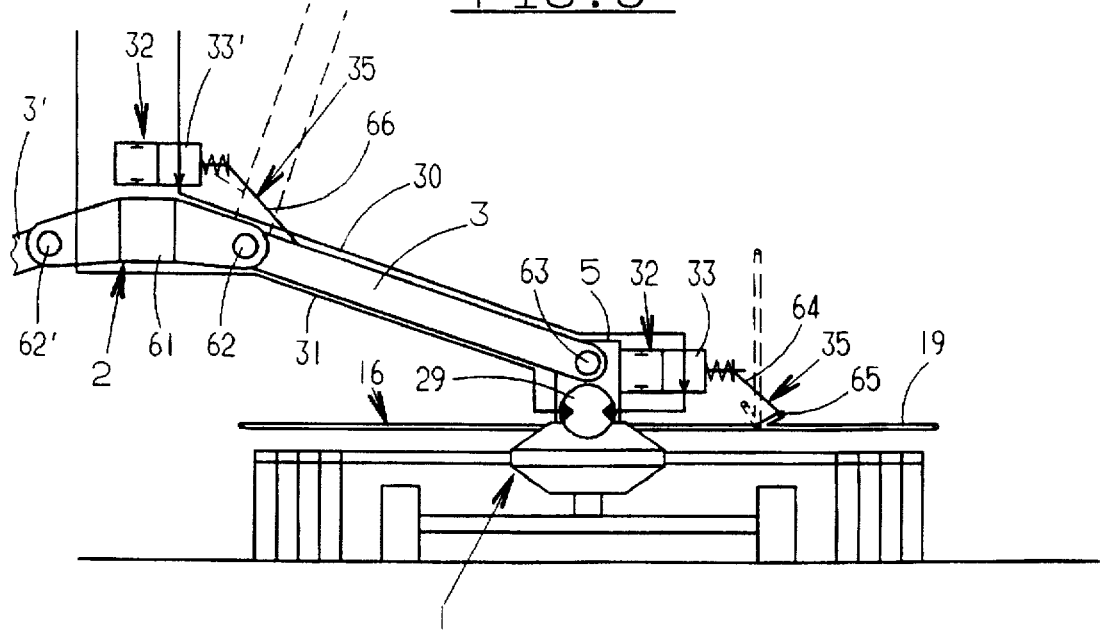
FIG. 6 represents a rear view of another example of implementation of a machine in accordance with the invention.

The example in accordance with FIG. 6 refers to a machine on which the beam (3) which carries the rotor (1) is articulated on a stringer (61) of the frame (2) by means of an axis (62) directed in the direction of forward movement (A). This stringer (61) has at its forward end a device for attachment to a tractor and at its rear end a train of carrying wheels. A second beam (3') with a rotor similar to rotor (1) can be articulated on the stringer (61) so as to increase the working width of the machine. Each beam (3, 3') can be displaced about its axis of articulation (62, 62') into a position which is approximately vertical for transport. This position is indicated with broken lines. This displacement is preferably accomplished by means of hydraulic jacks.

Each rotor (1) of this machine is approximately identical to that described in connection with the example of FIG. 1. The stationary semi-housing (5) is articulated on the beam (3) by means of an axis (63) which is directed in the direction of forward movement (A). This axis (63) especially allows rotor (1) to follow the unevenness of the ground.

The machine in accordance with FIG. 6 includes two stopping devices (32) of driving action for each of its rotors (1). These stopping devices (32) comprise the slide valve distributors (33, 33') which are arranged on one of the lines (30, 31) which provide power for the hydraulic motor (29) of each rotor (1). The first slide valve distributor (33) is fastened to the semi-housing (5) of the rotor (1). This first slide valve distributor (33) is actuated by a device (35) which comprises a rod (64). The latter is connected to a lever (65) which is firmly fastened to a folding part (19) of the guard (16). The second slide valve distributor (33') is fastened to the stringer (61). Its actuation means (35) comprises an abutment or a lever (66) which is firmly fastened to the support beam (3) of the corresponding swathing rotor (1).

The aforementioned slide valve distributors (33, 33') have an open position and a closed position. On the distributors which are placed on the supply line (30) of the hydraulic motor (29) the closed position could be replaced by a position in which the oil is diverted toward an additional line which is directly branched to the return line (31). In this case the supply of the hydraulic motors (29) could be interrupted without the circulation of oil in the circuit being stopped.

Figure 2:
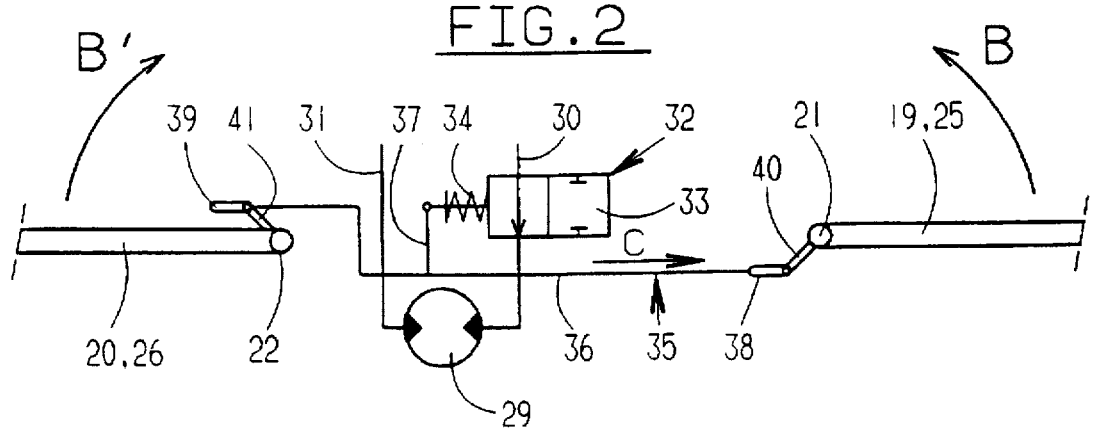
FIG. 2 represents schematically the stopping device and means of actuation in accordance with the example of FIG. 1.

During operation the swather in accordance with FIGS. 1 and 2 is attached to a tractor which allows one to displace it in the direction (A). The rollers (8 and 9) then roll along the ground. The two lateral parts (19 and 20) of the guard (16) are blocked in the position which is approximately horizontal. The deflector (27) is located on the side of the rotor (1), at a certain distance from the latter.

The two hydraulic lines (30 and 31) are connected to the hydraulic intakes of the tractor or to the pump of the piece of equipment belonging to the swather. The distributor (33) is in the position where the passage of oil into the supply line (30) is open (position shown in FIG. 2). The oil then circulates in the lines (30 and 31) and actuates the hydraulic motor (29). The hydraulic motor (29) drives housing (10) with the fork-carrying arms (11) to rotate about the shaft (6), in the direction of arrow (F). During this rotation the rollers of the ends of the arms (11) are displaced in the control cam which is housed in the housing (10). This cam guides the rollers so that they cause the arms (11) to pivot with the raking forks (13) on themselves at the time of each revolution. The forks (13) are then directed toward the ground in the forward part of their trajectory and gather the hay which is lying on the ground. As soon as they arrive with their arms (11) in the lateral part of their trajectory, in which they are displaced toward the rear part of the rotor (1), the forks (13) are pivoted upward at an angle of about 90°. They then store the gathered hay in the form of a swath.

For transport the width of the machine must be reduced in order to facilitate displacement. For this reason the two lateral parts (19 and 20) of the guard (16) can be folded upward and the fork-carrying arms (11) can be shortened by removing their external ends (12). In order to accomplish the folding the locking pins (23, 24) must be withdrawn and the lateral parts (19 and 20) must be pivoted about the articulation shafts (21 and 22) in the directions indicated by the arrows (B and B') in FIG. 2. As soon as the operator pivots any one of these parts (19, 20) its lever (40 or 41) pulls or pushes the rod (36) in the direction (C). This latter together with shaft (37) actuates the slide valve of the distributor (33) so that it closes the passage in the supply line (30) of the hydraulic motor (29). At that time the driving action of the hydraulic motor (29) is interrupted even if it was not carried out at the level of the pump of the hydraulic equipment of the tractor or the machine.

Rotation of the rotor (1) is thus stopped as long as any of the lateral parts (19 and 20) of the guard (16) is raised, which allows one to accede to the rotor (1) with no risk.

Subsequently, the operator unlocks the other lateral part (19 or 20) and displaces it upward until it is in an approximately vertical position. During this operation the end of its lever (40 or 41) displaces freely with respect to the rod (36)

in the corresponding oblong opening (38 or 39). The two lateral parts (19 and 20) can also be blocked in the vertical position by means of pins (23 and 24) which one engages in the openings which are provided for this purpose.

In order to return to the operating position, the operator unlocks one of the lateral parts (19, 20) and causes it to pivot about its articulation shaft (21 or 22) until it is in the horizontal position. During this pivoting, the end of the lever (40 or 41) of the lateral part (19, 20) in question displaces freely in the oblong opening (38 or 39) of the rod (36). Subsequently, when one is causing the other lateral part (19 or 20) to pivot the lever (40 or 41) of the latter releases the rod (36).

The spring (34) then pushes the shaft (37) and the rod (36) and causes displacement of the slide valve of the distributor (33). The latter therefore is replaced in the position in which the passage in the hydraulic line (30) is open. In this position the guard (16) correctly ensures its function and the hydraulic motor (29) can again be actuated.

The example of implementation in accordance with FIG. 3 functions in the same manner as the aforementioned example. The two rods (42 and 43) and the slide valve of the distributor (33) form a complete unit which works as the aforementioned rod (36), when the lateral parts (19 and 20) of the guard (16) are displaced about their articulation shafts (21 and 22).

When in the example according to FIG. 4 the operator raises any one of the lateral parts (19, 20) into the transport position, its lever (50 or 51) actuates the rod (48 or 49) to which it is connected. The latter then displaces the slide valve of the corresponding distributor (33 or 33') so that it closes the passage into the hydraulic line (30 or 31) on which it is located. Because of this the circulation of the oil is blocked and the hydraulic motor (29) is stopped.

The lateral part (19 or 20), which is displaced second, causes closing of the other distributor (33 or 33') in the same manner.

Inversely, when the operator converts the machine to the operating position, he displaces the lateral parts (19 and 20) one after the other into the horizontal position. Each part (19, 20) then causes opening of the corresponding distributor (33 or 33'). However, the circuit in the lines (30 and 31) is reestablished only when the two distributors (33 and 33') are open. Driving of the rotor (1) by the hydraulic motor (29) can then only take place at the time when the two lateral parts (19 and 20) of the guard (16) are correctly positioned.

In the example according to FIG. 5, the transposition of the lateral parts (19 and 20) of the guard (16) to the transport position is accomplished by means of the hydraulic jack (52). When the latter is actuated so that it retracts, its rod (56) first approaches the deflector (59) from the rotor (1). Next the abutment (57) comes in contact with the slide valve of the distributor (33) and actuates it so that it closes the passage in the supply line (30) of the hydraulic motor (29). The latter is then automatically stopped. Immediately after this the abutment (57) meets the arresting device (60) and pulls the lateral part (19) upward, around the articulation shaft (21). As soon as this lateral part (19) reaches its raised position, the traction of the hydraulic jack (52) causes pivoting upward, about the articulation shaft (22), of the second lateral part (20).

In order to return to the working position the operator actuates the hydraulic jack (52) so that it elongates. At first, the two lateral parts (19 and 20) pivot downward around the shafts (21 and 22) until they are again in the horizontal position. Subsequently, the rod (56) of the hydraulic jack (52) pushes the abutment (57) on the cross piece (25) so that it releases the slide valve of the distributor (33). The latter then automatically returns to the position in which the passage into the supply line (30) is open.

In the example of implementation in accordance with FIG. 6 the transposition of each rotor (1) into the transport position requires two operations. The first of these operations comprises reducing the dimensions of the rotors (1) and the second comprises raising the rotors (1) by means of the beams (3, 3') into a position which is approximately vertical in order to reduce the width of the machine. For the small displacements or to make a half turn at the end of the plot of land it is also possible to raise the rotors (1) without first reducing their dimensions.

In order to accomplish the first of the above-noted operations the operator folds back the lateral part (19) of the guard of each rotor (1) upward and shortens the fork-carrying arms (11). In this manner he reduces the width of the rotors (1) and consequently the height of the assembly when the rotors (1) are raised to a position which is approximately vertical. At the time of the folding of the lateral part (19), its lever (65) and the rod (64) actuate the slide valve of the distributor (33). The latter then closes the passage of oil into the supply line (30) of the hydraulic motor (29). Driving action of the rotor (1) is then automatically interrupted.

On the other hand, at the time of the raising of the beam (3) into a position which is approximately vertical, its lever (66) actuates the slide valve of the distributor (33') so that it will also close the passage of oil into the supply line (30). This closing is very important in case of small displacements which do not require folding back of the lateral part (19) of the guard (16) of the rotor (1). The distributor (33') then interrupts driving action of the hydraulic motor (29), which immobilizes the corresponding rotor (1).

To return to the operating position each rotor (1) is lowered with its beam (3 or 3') until it touches the ground. At the time of this displacement the lever (66) releases the slide valve of the distributor (33'). The latter then returns to its position where the passage into the supply line (30) is open. Subsequently, if necessary, the operator displaces the lateral part (19) of the guard (16) into a position which is approximately horizontal. The lever (65) and the rod (64) then release the slide valve of the distributor (33) which returns to the position in which the passage into the supply line (30) is open. In this position the hydraulic motor (29) will again be actuated in order to drive the rotor (1).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A haymaking machine, especially a swather, comprising:

at least one swathing rotor carried by a frame which can be attached to a tractor, said rotor being driven to rotate during operation by a hydraulic motor which is supplied by hydraulic lines which are connected to a hydraulic pump, said frame additionally carrying a guard which at least partially surrounds said rotor and includes at least one folding part which can be folded back to reduce the dimensions of the guard;

at least one stopping device for stopping a driving action of the rotor, said at least one stopping device being placed on one of the hydraulic lines which lead to the hydraulic motor and being adjustable between at least a position in which a passage on the one of the hydraulic lines is open and a position in which the passage is closed; and actuating means for actuating said stopping device, said actuating means being connected to the folding part or parts of the guard.

2. A machine according to claim 1, wherein the stopping device comprises a slide valve distributor with several positions.

3. A machine according to claim 2, comprising two of said folding parts, wherein the actuating means comprises a rod which is connected to the two folding parts and a shaft which is connected to a slide valve of said slide valve distributor.

4. A machine according to claim 3, wherein the rod includes at each of its ends an oblong opening, and each folding part of the guard includes a lever having an end which is engaged in one of the oblong openings.

5. A machine according to claim 2, wherein the actuating means of the slide valve distributor comprises two rods, each of said rods having an end connected to a slide valve of said slide valve distributor and another end which has an oblong opening, and the guard includes two of said folding parts, each of said folding parts having a lever with an end which is engaged in one of the oblong openings.

6. A machine according to claim 4, wherein a length of each of the oblong openings is approximately equal to a value of displacement of the end of the corresponding lever of the folding parts of the guard.

7. A machine according to claim 5, wherein a length of each of the oblong openings is approximately equal to a value of displacement of the end of the corresponding lever of the folding parts of the guard.

8. A machine according to claim 4, wherein the ends of the levers are abutted against a same side in the oblong openings when the folding parts of the guard are in a position which is approximately horizontal.

9. A machine according to claim 5, wherein the ends of the levers are abutted against a same side in the oblong openings when the folding parts of the guard are in a position which is approximately horizontal.

10. A machine according to claim 1, wherein the guard includes two of said folding parts and the stopping device comprises two slide valve distributors, each one of the slide valve distributors being connected to one of said folding parts.

11. A machine according to claim 10, comprising a further actuating means, wherein each of the slide valve distributors is connected to one of the actuating means, each of the actuating means comprising a rod having one end which is connected to a slide valve of the corresponding slide valve distributor, and a further end which is connected to a lever that is firmly attached to the corresponding folding part of the guard.

12. A machine according to claim 1, wherein the stopping device comprises a slide valve distributor which is placed on one of the hydraulic lines, and the actuating means comprises an abutment which is firmly attached to a rod of a hydraulic jack which is adapted to displace the at least one folding part of the guard.

13. A machine according to claim 12, wherein the abutment is designed so that it can actuate the slide valve distributor before displacing the at least one folding part of the guard.

14. A machine according to claim 12, wherein the slide valve distributor is secured to the at least one folding part of the guard.

15. A machine according to claim 1, comprising a further actuating means, wherein the at least one rotor is connected to a support beam which can be displaced upward and includes two of said stopping devices for stopping the driving of each rotor, to which the actuating means are connected, one of the actuating means being connected to the folding part of the guard, and the other of the actuating means being connected to the support beam.

16. A machine according to claim 15, wherein the stopping devices comprise slide valve distributors which are arranged on one of the hydraulic lines.

17. A machine according to claim 16, wherein a first slide valve distributor of said slide value distributors is secured to a semi-housing of each rotor and its actuating means comprises a rod which is connected to a lever which is firmly attached to the folding part of the guard.

18. A machine according to claim 16, wherein a second slide valve distributor of said slide valve distributors is secured to the frame and its actuating means comprises a lever which is one piece with the support beam of the corresponding swathing rotor.

* * * * *